April 21, 1942.    A. F. BLACK    2,280,466
DISSOLVING APPARATUS
Filed June 30, 1938
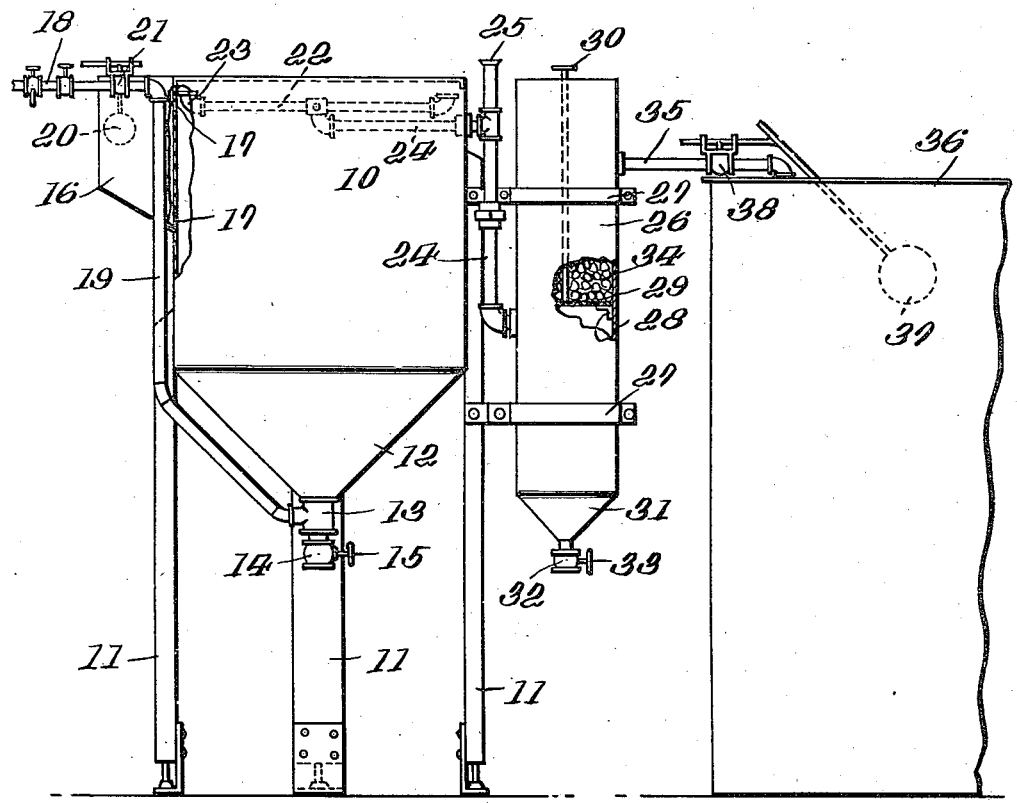
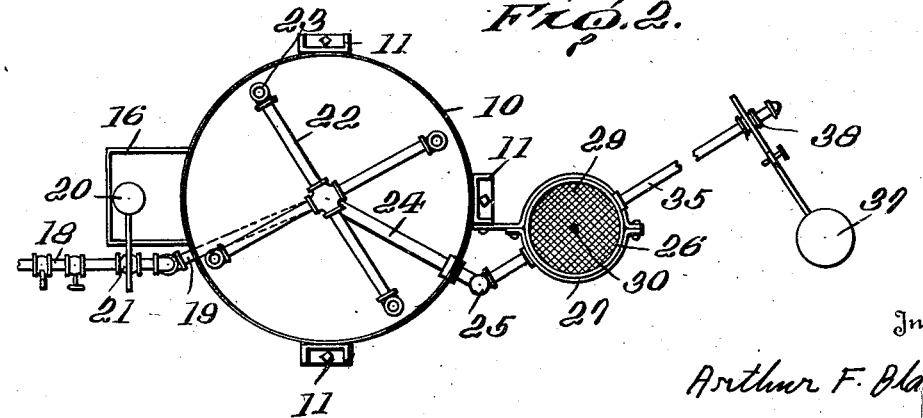
Inventor
Arthur F. Black
By Mason + Porter
Attorneys Patented Apr. 21, 1942

2,280,466

UNITED STATES PATENT OFFICE 2,280,466

DISSOLVING APPARATUS

Arthur Friezland Black, Charlotte, N. C., assignor to Myles Salt Company, New Orleans, La., a corporation of Louisiana Application June 30, 1938, Serial No. 216,811

2 Claims. (Cl. 23—272)

The present invention relates to new and useful improvements in a dissolving apparatus, and more particularly to improvements in an apparatus for dissolving salt, such as common rock salt, in order to obtain a clear, fully saturated brine solution.

An object of the present invention is to provide a salt dissolving apparatus which is adapted to produce a substantially uniform supply of clear brine solution over relatively long periods of time.

A further object of the invention is to provide a salt dissolving apparatus wherein insoluble matter and undissolved particles are removed from the brine solution without any appreciable clogging of the apparatus.

A further object of the invention is to provide a salt dissolving apparatus wherein a solvent is passed upwardly through a salt bed for producing the brine solution and wherein means are provided for removing insoluble matter and undissolved particles from the saturated brine solution before it is delivered to a storage tank.

A still further object of the invention is to provide a salt dissolving apparatus of the above type, wherein the brine solution is passed into a settling chamber for removing insoluble matter and undissolved particles, and wherein the brine solution is then passed through a filtering device before being delivered to the storage tank.

The invention still further aims to provide a salt dissolving apparatus which is simple in construction, inexpensive to manufacture, and which is adapted to produce a highly saturated brine solution which is substantially free from objectionable impurities.

The above and other objects of the invention will in part be obvious, and will be hereinafter more fully pointed out.

In the accompanying drawing,

Figure 1 is a side elevation, with parts thereof in section, illustrating the improved dissolving apparatus.

Figure 2 is a top plane view of the apparatus shown in Figure 1.

It is often desirable to produce a clear and colorless brine solution. Common rock salt is seldom pure and usually contains impurities and insoluble matter of various types. A brine solution ordinarily made from such rock salt carries with it a certain amount of the impurities and insoluble particles. Unless proper precautions are taken, brine made from common rock salt is often discolored because of the impurities, and such brine is unsatisfactory for use where a clear colorless solution is essential. The apparatus of the present invention is one which is adapted to produce a saturated brine solution which is free from impurities and insoluble particles. The apparatus is designed to effect a substantially uniform production of a clear brine solution over relatively long periods of time without any appreciable clogging of the apparatus.

Referring more in detail to the accompanying drawing, one form of the invention is shown for purposes of illustration. A dissolving vat 10 is supported and carried by upright brackets 11. The upper portion of the vat is cylindrical and is provided with a conical bottom wall 12 which communicates through a T-coupling 13 with a valve housing 14. The valve (not shown) within the valve housing 14 is controlled by a suitable handle 15 and is maintained closed during normal operation of the apparatus. Salt is deposited in the vat 10 by any suitable delivery means, such as a hopper or the like. The upper portion of the vat 10 is provided with a chamber 16 which is disposed at one side thereof and which is in communication with the vat through openings 17 in the side wall thereof.

A suitable solvent, such as water, is delivered from a source of supply through a pipe conduit 18 and then downwardly through a pipe line 19 to the T-coupling 13. The chamber 16 serves as a float chamber for a float 20 which is adapted to control a valve 21 in the delivery pipe 18. The openings 17 in the wall of the vat 10 afford communication between the vat and the chamber 16 so that the liquid level of the solution in the vat 10 and in the chamber 16 will be the same. Thus, the float 20 will respond to changes in the liquid level so as to control the admission of solvent to the bottom of the vat.

When the valve 21 is open, the solvent will flow through the pipes 18, 19 and the coupling 13 into the conical bottom 12 of the vat 10. The solvent will then rise through the salt bed contained in the vat, thus producing a highly saturated brine solution. The maximum dissolving action thus takes place when the solvent first contacts with the salt bed at the bottom of the vat so that insoluble particles and undissolved matters tend to accumulate in the bottom of the vat. The remaining portion of the salt bed which substantially fills the vat 10 serves as a filtering means during the upward flow of the solvent therethrough.

At the upper end of the vat 10, suitable means are provided for collecting the brine solution. In the illustrated form of the invention, the collecting means includes a plurality of radially extending pipes 22 which are provided with upwardly extending open ends 23. The ends 23 of the pipes 22 are disposed around the periphery of the vat at spaced intervals so as to prevent any local channelling of the salt bed during the upward flow of solvent therethrough. The brine solution passes into the open ends 23 of the pipes 22 at the top of the vat. The pipes 22 communicate with a discharge pipe 24 which leads outside of the vat 10 to a vertically disposed pipe 24 which is vented to the atmosphere as at 25.

A second vat or receptacle 26 is disposed adjacent the vat 10 and is carried by means of brackets 27 which are secured to one of the upright supporting brackets 11. The receptacle 26 is somewhat smaller than the vat 10 and is provided substantially midway between the ends thereof with brackets 28 secured to the inner surface thereof. A screen 29 extends across the receptacle 26 and is supported on the brackets 28. The screen is secured to a handle rod 30 by which it may be upwardly removed from the container for cleaning or repairing purposes. The lower end of the receptacle 26 is provided with a conical bottom wall 31 which communicates with a valve housing 32. The valve (not shown) is controlled by a suitable handle 33 and is maintained closed during normal operation of the apparatus.

The vertical pipe 24 is disposed between the vat 10 and the receptacle 26 and opens into the receptacle 26 at a point slightly below the screen 29. The saturated brine solution passing from the collecting pipes 22 into the pipe 24 is thus admitted to the lower portion of the receptacle 26 below the screen 29. The pipe 24 communicates with the receptacle 26 in such a manner that the solution enters below the screen 29 substantially parallel thereto. The lower portion of the receptacle 26 affords a settling chamber in which undissolved and insoluble particles, together with other impurities, will settle to the bottom thereof. The brine solution, after first passing into the settling chamber, then passes upwardly through the screen 29 and through a filter, such as a gravel filter 34, which is supported on the screen 29. The gravel filter removes any minute particles which are not settled out in the settling chamber in the lower portion of the receptacle 26 below the screen 29. A clear and colorless brine solution is then delivered from the upper portion of the receptacle 26 to a pipe 35 which delivers the solution to a brine storage tank 36. The delivery of the brine solution to the storage tank is controlled by a float 37 which operates a valve 38 in the pipe line 35.

In the operation of the apparatus, the vat 10 is substantially filled with salt. Water or other solvent is admitted through the pipes 18, 19 into the coupling 13 which communicates with the lower end of the conical bottom 12 of the vat 10. The solvent then flows upwardly through the salt bed contained in the vat. The maximum dissolving action takes place when the solvent first contacts with the salt so that accumulation of insoluble particles and other impurities is effected at the bottom of the vat. The solution thus formed is collected by means of the collecting pipes 22. This solution passes into the open ends 23 of the pipes and is then delivered into the pipe 24. The disposition of the open ends 23 of the pipes 22 is such that an even distribution of the solvent is effected in rising through the vat.

The solution which is drawn off from the top of the vat is highly saturated and may contain undissolved salt crystals and a few insoluble particles. In order to produce a clear and colorless brine solution which is free of insoluble particles and impurities, this solution is directed from the vertically disposed pipe 24 into the lower portion of the receptacle 26. The solution is admitted into the receptacle 26 below the screen 29 and the gravel filter 34 and this lower portion of the receptacle 26 provides a settling chamber. Insoluble particles and undissolved crystals will tend to settle at the bottom of the receptacle 26. The temperature of the solution may rise slightly in passing from the top of the vat 10 into the lower portion of the receptacle before passing upwardly through the filter. Thus, a few of the salt crystals carried by the solution may be dissolved therein so that a uniformly saturated brine solution is produced. The solution entering below and substantially parallel to the screen 29 in the receptacle 26 causes mild agitation below the screen so that any solid particles or undissolved salt crystals which would ordinarily tend to accumulate on the bottom of the screen are mildly disturbed and constantly washed off and settled so as to permit a free upward flow of the solution through the filter. Any very minute solid particles are finally removed from the solution as it passes upwardly through the screen 29 and the gravel filter 34. The clear, colorless and highly saturated brine solution is then delivered through the pipe 35 into the brine storage tank 36.

The upward flow of the solvent through the salt contained in the vat 10 creates a mild disturbance of the salt bed so as to prevent packing thereof. Similarly, the upward flow of the solvent through the vat 10 mildly disturbs the accumulated insoluble matter at the bottom of the vat so that packing thereof is prevented. The elimination of packing in the vat 10 prevents any appreciable clogging of the apparatus so that a substantially uniform flow of the brine solution is produced. Likewise, clogging or packing of the filtering means 34 is prevented by reason of the upward flow of the brine solution therethrough.

The apparatus is automatic in its operation. The level of the solution in the float chamber 16 which is in communication with the top of the vat 10 controls the admission of the solvent to the bottom of the vat by means of float controlled valve 21. Similarly, the level of the brine solution in the storage tank 36 operates through the float 37 to control the valve 38 in the delivery pipe 35, thus controlling the delivery of the brine solution. When it is necessary to clean the apparatus, the valve in the bottom of the vat 10 may be opened by means of the handle 15. The valve thus serves as a flushing valve in that the insoluble matter and other impurities which have accumulated in the lower portion of the salt bed can be eliminated without discharging the entire salt bed. Thus, the useful salt which remains in the top of the vat 10 need not be flushed through the valve. Similarly, the receptacle 26 can be flushed by opening the valve in the bottom thereof. Any insoluble particles and other impurities which have settled in the bottom thereof can thus be eliminated. The screen 29 and the gravel filter 34 which is supported thereon may be removed from the receptacle 26 by means of the handle rod 30 for cleaning or repairing purposes.

From the foregoing description, it will be seen that there is provided a highly efficient salt dissolving apparatus which is adapted to produce a uniform supply of a clear colorless brine solution over relatively long periods of time. One form of the invention has been shown in the accompanying drawing, but it is to be clearly understood that various changes in the details of construction and arrangement of parts may be made without departing from the scope of the invention as set forth in the appended claims.

I claim:

1. A salt dissolving apparatus for producing a highly saturated brine solution without substantial clogging of the apparatus, comprising a vat for containing the salt to be dissolved, a supply conduit for directing the solvent to the bottom of said vat whereby to effect upward movement of the solvent through the salt bed, a vertically disposed receptacle independent of said vat and having filtering means disposed intermediate the ends thereof and also intermediate the top and bottom of said vat, said receptacle providing a settling chamber below said filtering means and in advance thereof with respect to the direction of flow of brine solution therethrough, an overflow conduit means determining the level of solution in said vat and open to the atmosphere and extending downwardly from the upper portion of said vat and affording communication with said receptacle immediately below said filtering means and above the bottom of said vat, said conduit means communicating with the receptacle in a substantially horizontal direction for directing the brine solution horizontally across the bottom of said filtering means for producing mild washing across the filtering means to prevent crystallization of the saturated brine solution thereon without disturbing material which may have settled to the bottom of the settling chamber, and a discharge conduit communicating with the receptacle above the filtering means for discharging the solution after it has passed upwardly from the settling chamber through the filtering means.

2. A salt dissolving apparatus for producing a highly saturated brine solution without substantial clogging of the apparatus, comprising a vat for containing the salt to be dissolved, a supply conduit for directing the solvent to the bottom of said vat whereby to effect upward movement of the solvent through the salt bed, a vertically disposed receptacle independent of said vat and having filtering means disposed intermediate the ends thereof and also intermediate the top and bottom of said vat, said receptacle providing a settling chamber below said filtering means and in advance thereof with respect to the direction of flow of brine solution therethrough, an overflow conduit means determining the level of solution in said vat and open to the atmosphere and extending downwardly from the upper portion of said vat and affording communication with said receptacle immediately below said filtering means and above the bottom of said vat, said conduit means communicating with the receptacle in a substantially horizontal direction for directing the brine solution horizontally across the bottom of said filtering means for producing mild washing across the filtering means to prevent crystallization of the saturated brine solution thereon without disturbing material which may have settled to the bottom of the settling chamber, a flush valve at the bottom of said settling chamber and operable to permit discharge of any settled material, and a discharge conduit communicating with the receptacle above the filtering means for discharging the solution after it has passed upwardly from the settling chamber through the filtering means.

ARTHUR FRIEZLAND BLACK.